United States Patent
Jalet et al.

(10) Patent No.: US 8,038,918 B2
(45) Date of Patent: Oct. 18, 2011

(54) MULTIPLE COMPONENT CONTAINER AND METHOD OF MOLDING SAME

(75) Inventors: Vincent Jalet, Brussels (BE); Robert H. C. M. Daenen, Aalst (BE); Victor J. J. Cautereels, Ranst (BE)

(73) Assignee: Dart Industries Inc., Orlando, FL (US)

( * ) Notice: Subject to any disclaimer, the term of this patent is extended or adjusted under 35 U.S.C. 154(b) by 606 days.

(21) Appl. No.: 11/207,747

(22) Filed: Aug. 22, 2005

(65) Prior Publication Data

US 2005/0274688 A1 Dec. 15, 2005

Related U.S. Application Data

(62) Division of application No. 10/106,926, filed on Mar. 26, 2002, now Pat. No. 6,986,437.

(60) Provisional application No. 60/354,490, filed on Feb. 8, 2002.

(51) Int. Cl.
*B29C 45/16* (2006.01)

(52) U.S. Cl. .................. 264/255; 264/328.1; 264/328.8

(58) Field of Classification Search .................. None
See application file for complete search history.

(56) References Cited

U.S. PATENT DOCUMENTS

| | | | | |
|---|---|---|---|---|
| 3,309,448 A * | 3/1967 | Schilling | ..................... | 264/245 |
| 3,914,081 A * | 10/1975 | Aoki | ..................... | 425/130 |
| 5,647,930 A * | 7/1997 | Bright | ..................... | 156/73.5 |
| 6,561,376 B2 * | 5/2003 | Price et al. | ..................... | 220/669 |

* cited by examiner

*Primary Examiner* — Monica A Huson

(57) ABSTRACT

A container and method of forming intimately bonded plastic components including a lower base with a closed bottom and an upstanding peripheral wall, and an upwardly extending ring telescopically engaged with the base and extending from a lower edge at an intermediate height on said base wall to an upper edge vertically spaced above the base wall to define three distinct zones along the height of the container.

13 Claims, 5 Drawing Sheets

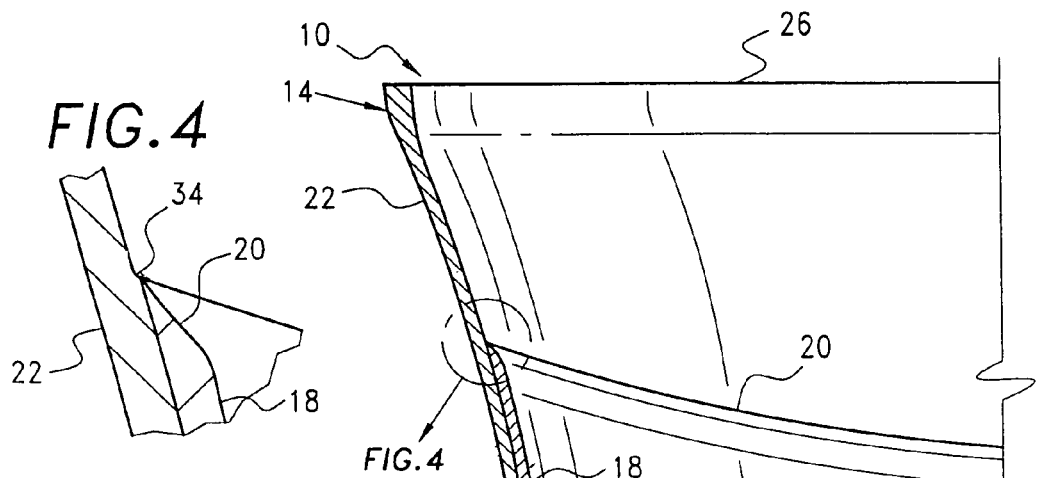
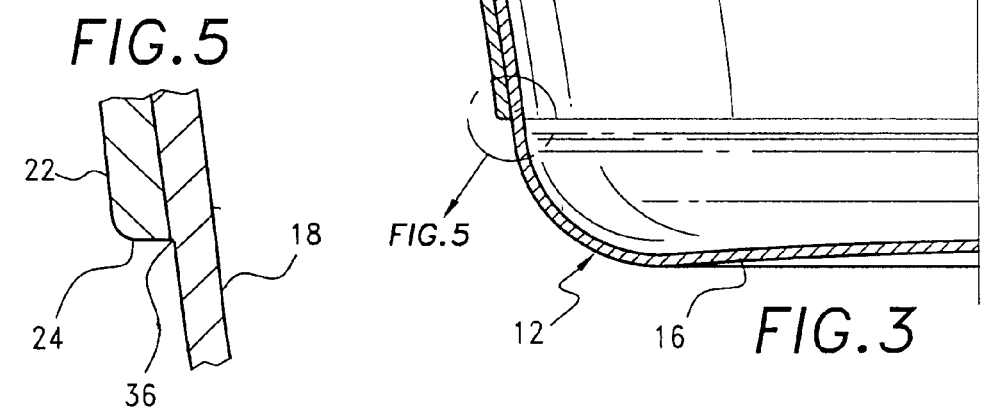
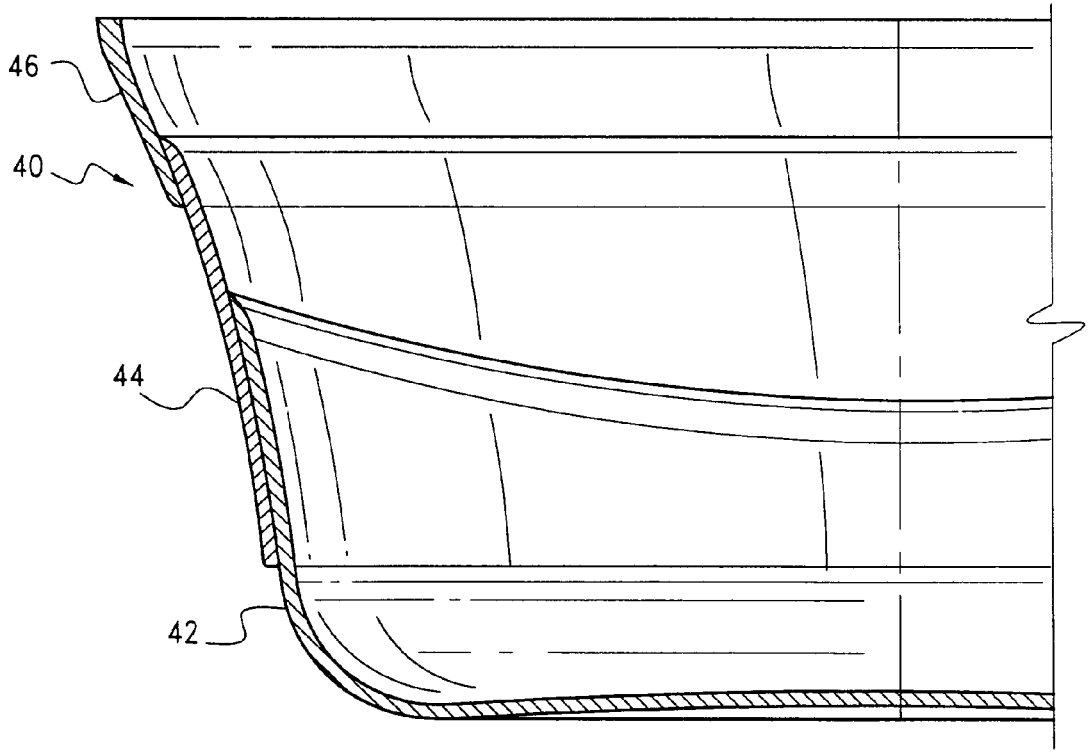

MULTIPLE COMPONENT CONTAINER AND METHOD OF MOLDING SAME

CROSS-REFERENCE TO RELATED APPLICATION

This application is a Divisional of the U.S. patent application Ser. No. 10/106,926, filed on Mar. 26, 2002, now U.S. Pat. No. 6,986,437, and claims the benefit of the U.S. Provisional Patent Application No. 60/354,490, filed on Feb. 8, 2002, entitled "Container and Method", the contents of which are incorporated herein by reference.

BACKGROUND OF THE INVENTION

The present invention broadly relates to molded plastic containers formed in multiple layers of appropriate synthetic resinous materials.

While such containers are generally known, as will be seen in U.S. Pat. No. 3,309,448, issued Mar. 14, 1967, such known containers basically comprise duplicate layers coextensive with each other with each layer in itself being of a full receptacle configuration. In the container described in U.S. Pat. No. 3,309,448, the purpose of the multiple layers is to provide for a two-tone appearance.

In another known form of multiple layer container, the first receptacle defining component will have a second receptacle defining component enclosing only the lower portion of the first receptacle component, thus providing a particular aesthetic appearance involving lower and upper zones.

As will be seen, for example in U.S. Pat. No. 3,914,081, the bowl and ring portions of the serving bowl could be formed together in one injection molding apparatus. The apparatus described in U.S. Pat. No. 3,914,081, which is expressly incorporated herein by reference in its entirety herein, discloses a machine that would allow for two step injection molding of ring and base portions of a container in accordance with the present invention.

SUMMARY OF THE INVENTION

A principal object of the present invention is to provide a container formed of multiple components wherein only one of the components is what might be considered a receptacle, that is having a closed bottom, while the other component or components so relate thereto as to define a completed container. The completed container will be of an extended height, have distinct aesthetic appearance characteristics, have at least three zones of varied appearances and incorporate such other features as will be noted in the structural combination of the multiple components.

The goals of the invention are basically achieved by a unique utilization of two components in forming the container. One component comprises a receptacle, that is a base unit with a bottom and upstanding peripheral walls terminating in an open upwardly directed mouth. The second component consists of a ring with a wide side wall terminating in vertically opposed open ends defined by continuous edges, forming in effect a collar or sleeve. The ring component conforms to the peripheral wall of the base component and is partially telescopically engaged therewith, lying either against the inner surface of the base wall or the outer surface thereof. The lower edge of the ring is spaced above the bottom of the base for an exposure of the lower portion of the base, with the ring extending upwardly beyond the open mouth of the base to form an extension of the base wall. In this manner, three zones are provided, a lower zone comprising the exposed portion of the base, a central zone defined by the overlapping ring and upper portion of the base, and an upper zone consisting solely of the ring.

With the two components being of different colors or shades of color, and with at least the outermost component being translucent or transparent, the resultant three zones will be of different colors with the lowermost and uppermost zones the colors of the particular components, and with the intermediate zone being a combination of the overlying colors. Even were the lowermost and uppermost zones of the same color, the intermediate zone would inherently appear darker, presenting an intermediate darker band surrounding the wall of the container. Along the same lines, and again assuming a transparency or translucency to the outer component, the overlapped edge of the inner component, whether this be the upper edge of the base or the lower edge of the ring, will be visible therethrough, thus providing for an additional decorative effect, particularly when such edge includes undulations therein.

It will also be appreciated that the overlapping of the components about an intermediate height on the peripheral wall of the formed container will tend to inherently strengthen the container. Further, as desired, multiple rings can be provided in a partially overlapping stacked relation on and above the base.

A still further object of the present invention is to provide a method, or process, for molding of synthetic resin a container initially formed of multiple components which, as a result of the method of this invention, become integral components of a container. In a preferred carrying forth of the manipulative steps of the method, there is molded, preferably by an injection molding technique, a generally open ring configured component and a generally closed end base component. Preferably, although not necessarily, conventional injection molding apparatus is utilized in a first molding step to mold the ring component followed by a second molding step to mold the base component. Such method may be characterized as an underinjection molding method.

The at least two step molding method of the present invention may be carried out in a single molding apparatus, such as exemplified by U.S. Pat. No. 3,914,081. However, it will be appreciated that the at least two step molding method of the present invention may be carried out using more than one molding apparatus, such as when a first component is molded in a first apparatus and the first component is transferred to a second molding apparatus to effect molding of a second component so as to form an integral member, such as a container.

Further objects and advantages of the invention will be noted as the construction and details of the invention are more fully hereinafter set forth.

BRIEF DESCRIPTION OF THE DRAWINGS

FIG. 3 is an enlarged cross-sectional view thereof taken substantially on a plane passing along line 3-3 in FIG. 1;

FIGS. 4 and 5 are enlarged details of the transition areas between the inner base and the outer ring at the areas indicated in FIG. 3;

FIG. 6 is a cross-sectional view of a variation wherein multiple rings are provided;

DESCRIPTION OF THE PREFERRED EMBODIMENTS

The foregoing goals of the invention are basically achieved by at least a two step method or process of molding, normally referred to as a co-injection process. The practice of the co-injection process of the present invention may be characterized as: a multi-injection 2C, i.e., two component; and a sandwich technique. Furthermore, the "2C" applications may used special two component machines fitted with a turning table, e.g. an EngelDK™ machine; and a transfer technique utilize two machines, e.g. Engel™ 500 and 550T machines, linked with a robot to transfer a first molded item from the first machine (first station mold) to a second station mold in a second machine to complete the co-injection process.

In the multiple component co-injection process of the present invention, generally in a first molding step, a ring component with a relatively wide side wall is molded, preferably of a first color, either translucent or even opaque, and then a second molding step a base component is molded and bonded together to form an article, such as a container. The bonding may be via chemical adhesion of an autogenous or adhesive nature.

A base component of a bowl, container or vessel produced in accordance with the present method may be of any cross-sectional shape, e.g., round, oval, elliptical, etc. and may be surmounted by a ring component that may terminate at its top edge in any shape, e.g., flat, wavy, undulated, inclined, etc. Likewise, the ring component at its bottom edge, while obviously following the shape of the base component, can also at its bottom edge terminate in any shape, e.g., flat, wavy, undulated, inclined, etc. Preferably, the ring component defines a "hole" the size of which exceeds the size of the base component. A significant aspect of the method of the present invention resides in the at least two step molding to integrally associate the base and ring components wherein the ring component partially overlaps the base component. The molding of the at least two component molded integral containers derived by the practice of the present invention will further be appreciated by the following description of structural embodiments of multiple component containers that may be molded in accordance with the present method.

Figure 1:
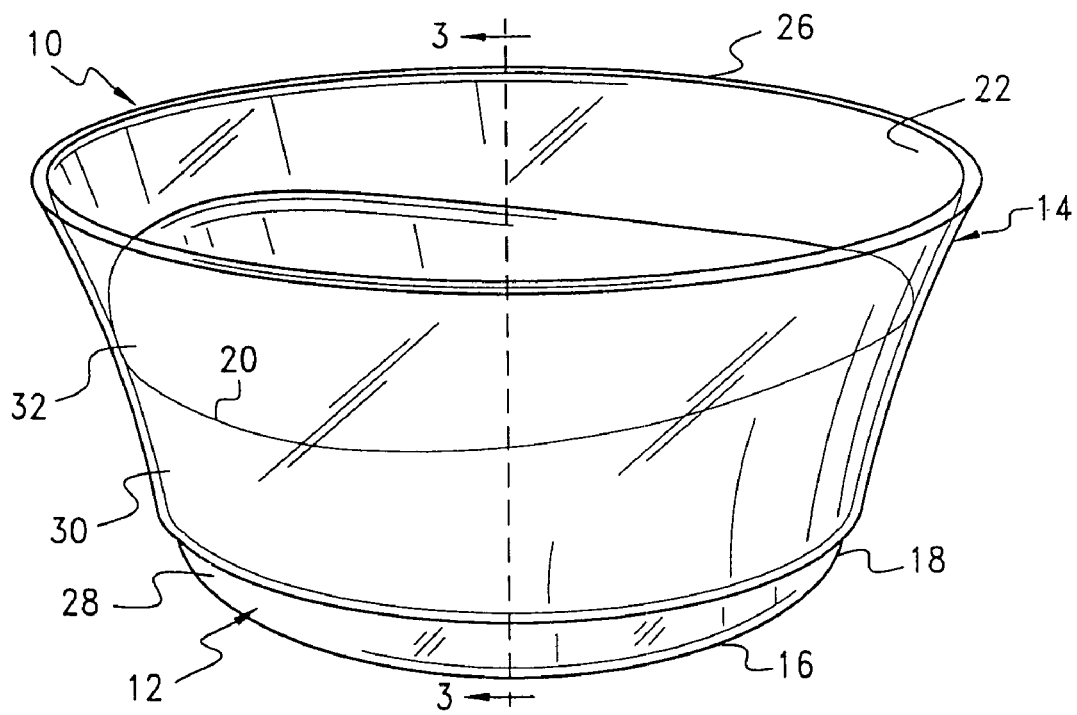
FIG. 1 is a perspective view of one embodiment of the invention wherein the ring comprises the outer component.
Figure 2:
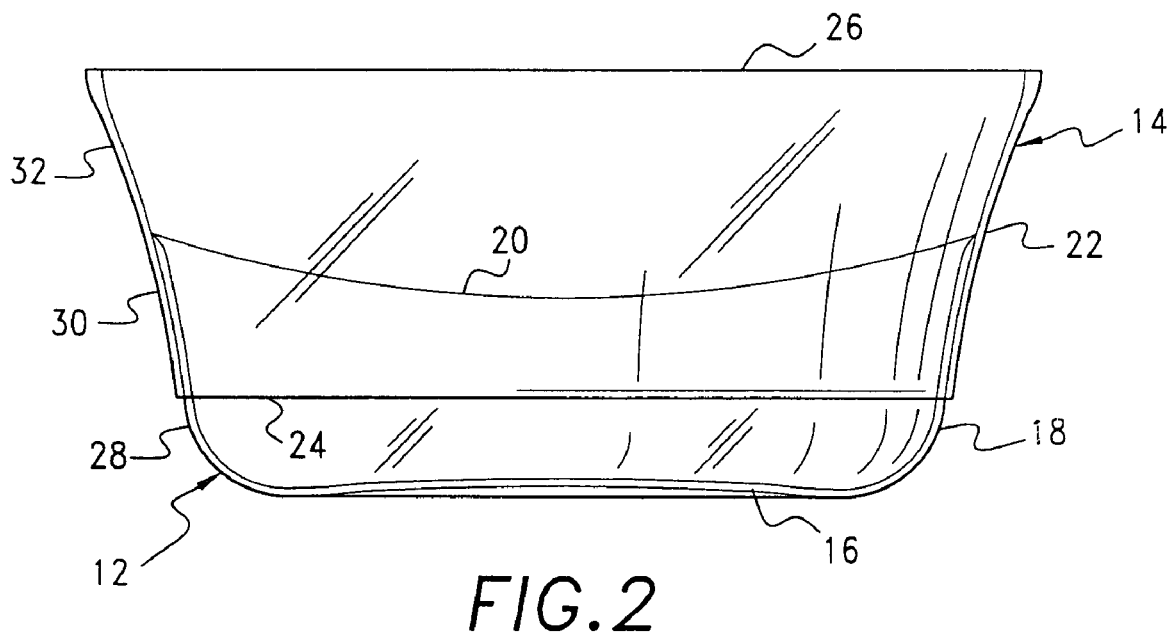
FIG. 2 is an elevational view thereof.

Referring now more specifically to the drawings, and with particular attention directed to FIGS. 1, 2 and 3, the container 10 illustrated therein is formed of two intimately joined components, a base component or portion 12 and a ring component or portion 14. The base 12 is in the nature of an upwardly opening receptacle comprising a closed bottom 16 with a peripheral wall 18 integral therewith and extending vertically therefrom. The wall 18 terminates in a continuous upper edge 20 which defines an upwardly opening mouth for the receptacle base 12.

The ring component or portion 14 comprises a vertical wall 22 having a continuous lower edge 24 defining an open bottom, and a continuous upper edge 26 defining an open top. Thus formed, the ring 14 provides what might be considered an extension of the base wall.

The ring 14 is telescopically received over the base 12 in intimate contact therewith and positioned with the lower edge 24 of the ring 14 upwardly spaced from the bottom 16 at some intermediate point along the height of the base wall 18, thereby exposing a portion of the base below the ring lower edge 24. The upper edge 26 of the ring 14 projects or is positioned at a predetermined height above the upper edge 20 of the base 12. With the base and ring related in this manner and intimately bonded to each other, the resultant container 10 consists of three distinct zones, a lower zone 28 consisting solely of the base 12, an intermediate or second zone 30 consisting of the overlying base and ring sections, and the upper or third zone 32 comprising solely the ring or portion of the ring above the upper edge 20 of the base.

Noting the enlarged detail illustrations presented in FIGS. 4 and 5, it will be seen that in order to provide for a smooth transition area about the inner surface of the formed container 10, the upper edge of the wall 18 of the inner component, in this instance the base 12, is rather sharply beveled upward and outward and aligns or blends into a similarly angled transition shoulder 34 provided on the inner surface of wall 22 of the outer component, in this instance the ring 14. This shoulder 34 is formed by a slight narrowing of the ring wall 22 at the point of intersection.

The lower edge of the wall 22 of the outer component, in this instance the edge 24 of the ring 14, is slightly rounded and aligns with a downwardly directed transition shoulder 36 defined in the outer surface of the wall 18 of the inner component, the base 12. This shoulder 36 is defined by a slight narrowing of the base wall 18.

As suggested with the illustrated upper edge 20 of the base 12, the various edges, whether this upper edge or the upper or lower edges of the ring 14, can be of various configurations, including undulations, in accord with the particular configuration desired, either for aesthetic or functional purposes.

As will be appreciated, the plastic or synthetic resin materials utilized in the formation of the components of the container, and the manner in which provision is made for the intimate bonding of the components can vary and will be determined by a consideration of many factors, including cost, the particular appearance sought, the nature of the container, the anticipated contents of the container, and the like. As one example, both of the components of the container 10 can be made from polycarbonate materials, utilizing an annealing treatment to release stresses coming from the molding process.

As will be recognized, the formed container, at approximately mid-height, will be defined by the overlapped inner and outer components, providing an encircling zone 30 of relatively greater strength whereby a degree of additional rigidity is introduced into the container.

The base and ring can be transparent, translucent or opaque. In this regard, it is preferred that the outer component, the ring 14 in FIGS. 1-3, be of one color and have some degree of transparency allowing for a viewing of the base 12 therethrough. The base 12 will in turn be of either the same or another color or shade thereof. In this manner, the appearance of the central zone 30 will be determined by a blending or merging of the colors of both the base and the overlying ring, while the lower zone will be the color of the base and the upper zone the color of the ring. The three zones will thus be distinctive and, with different colored inner and outer components, actually present three zones, each of which is a different color or shade, while utilizing only two components. This visual appearance can be enhanced by the visual appearance of the edges defining the upper and lower extents of the middle zone 30, as suggested by the undulations in edge 20.

FIG. 6 illustrates a variation of the invention wherein the container 40 utilizes a base 42, a first outer ring component 44 partially telescoped thereover, and a second upper ring component 46 partially telescoped over the upper portion of the first ring 44 and extending vertically thereabove. These components are all intimately bonded and combine to define five distinct zones. The details of construction of the first embodiment are incorporated herein, including the transition areas provided at the open edges of the base and rings, and the provision, if desired, of five distinctly different colored zones.

Figure 7:
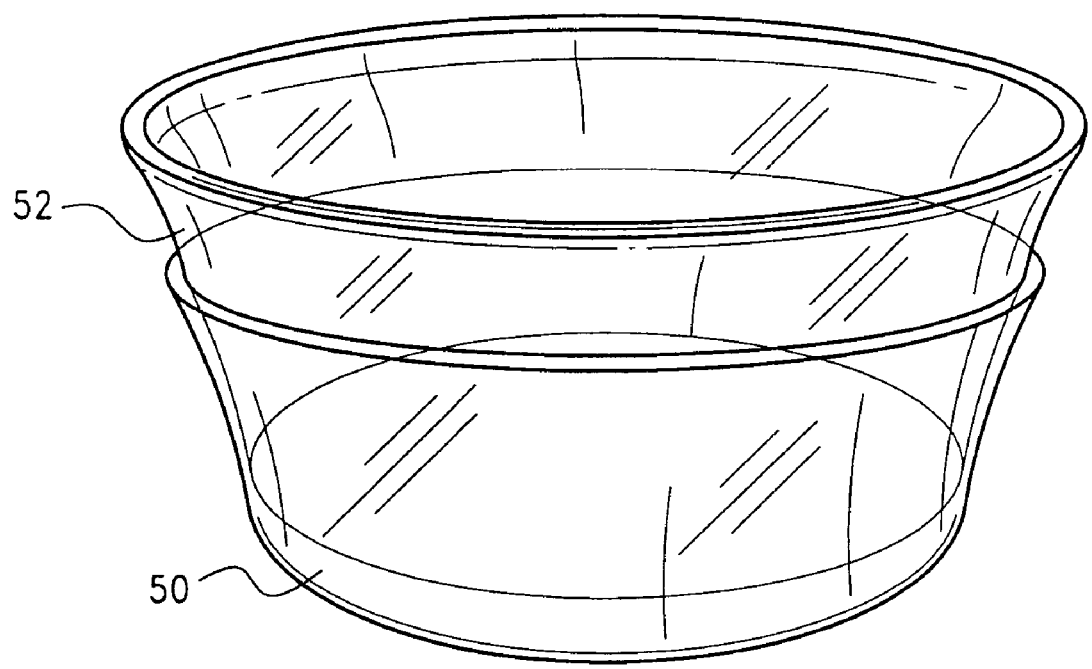
FIG. 7 is a perspective view of a further embodiment wherein the base comprises the outermost component with the ring telescoped therein.
Figure 8:
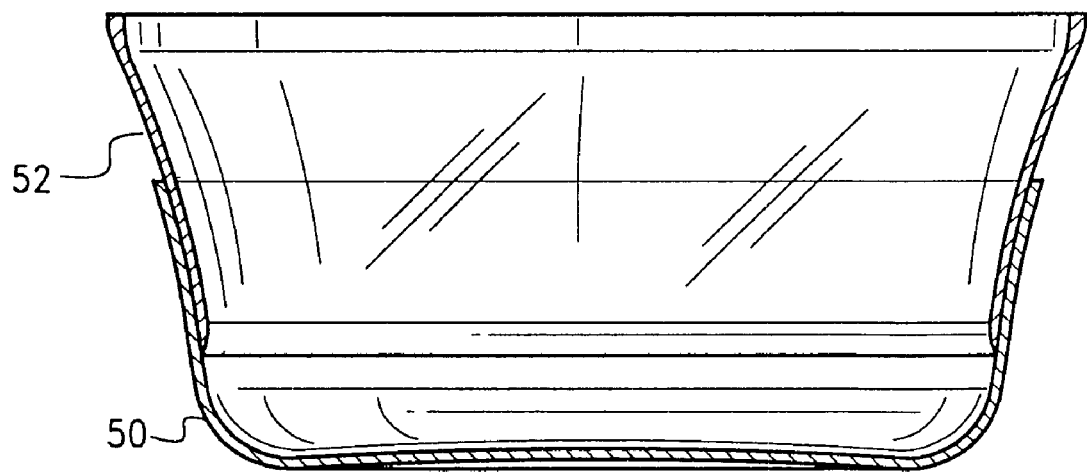
FIG. 8 is an elevational cross-section through the container of FIG. 7.

FIGS. 7 and 8 illustrate a further variation wherein the outer component comprises a base 50 with the companion ring 52 comprising the inner component partially telescopically received within and intimately bonded to the inner surface of the base wall. Similar transition areas are provided at the overlapping open edges, and all of the features and advantages as described with regard to the first embodiment are incorporated. For example, in providing for the three distinctly colored zones, the base 50, being the outer component, will have some degree of transparency while the inner component or ring 52 could, if so desired, be opaque. Incidentally, depending upon the effect desired, the outer component could also be opaque with the formed container having two distinctly appearing zones with the height of the container increased by the ring and the container having the aforementioned centrally reinforced area thereabout.

Figure 9:
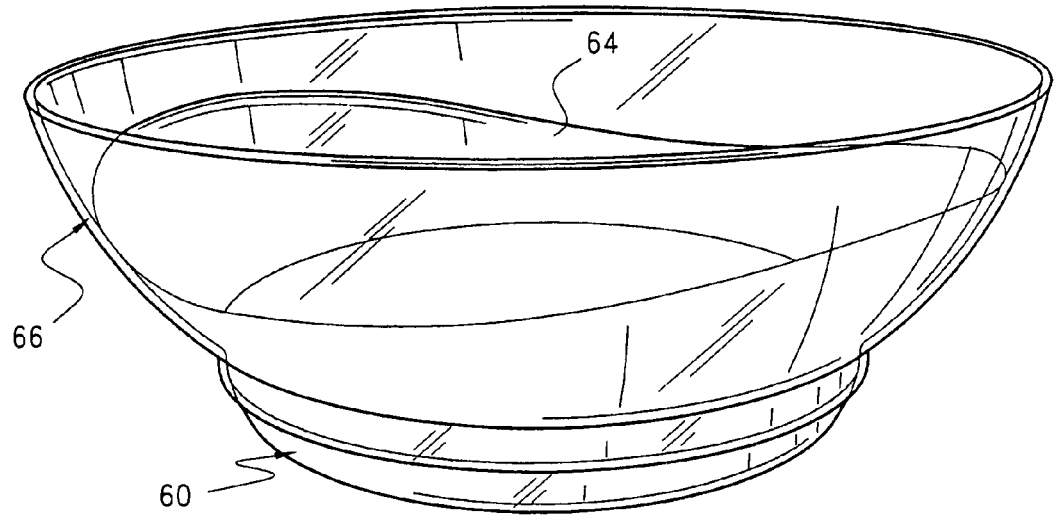
FIG. 9 is a perspective view of a further embodiment wherein the mouth of the inner base is defined by an undulating edge visible through the outer ring.
Figure 10:
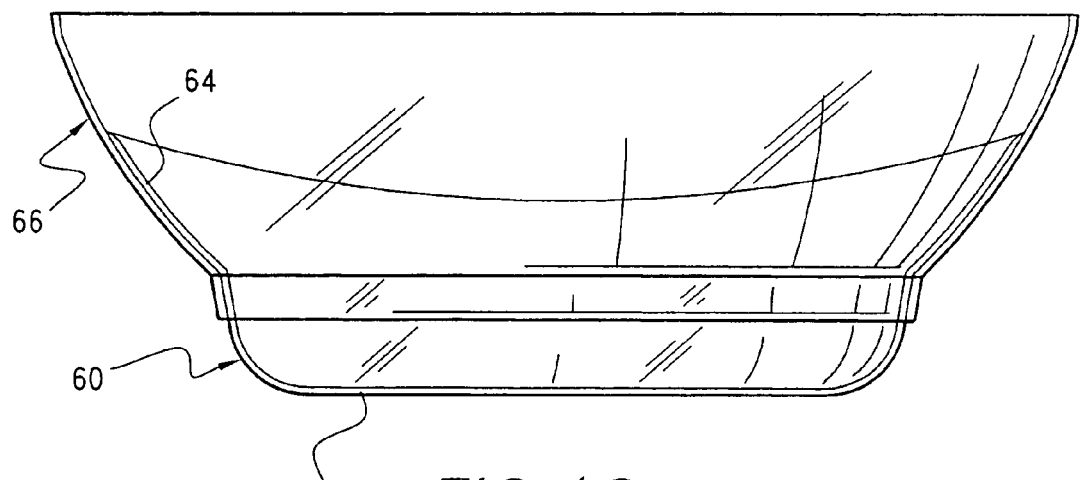
FIG. 10 is an elevational view of the container of FIG. 9.

FIGS. 9 and 10 illustrate a further possible container configuration wherein the base 60 has a generally cylindrical lower portion with a flat bottom 62, and a generally upwardly and outwardly arcing upper portion 64 defining a distinct bowl configuration. The upper outer component 66, forming the ring, encloses the upper portion of the base 64 and extends thereabove, and similarly encircles a minor upper section of the lower portion of the base 60. Thus formed, only the extreme lower portion of the base 60, directly above the bottom 62, is exposed as the lower zone. The intermediate zone is defined by the outwardly flaring upper portion 64 of the base 60, and the upper zone is defined by the upper portion of the ring 66 which follows the curvature of the upper portion 64 of the base and extends substantially thereabove.

Figure 11:
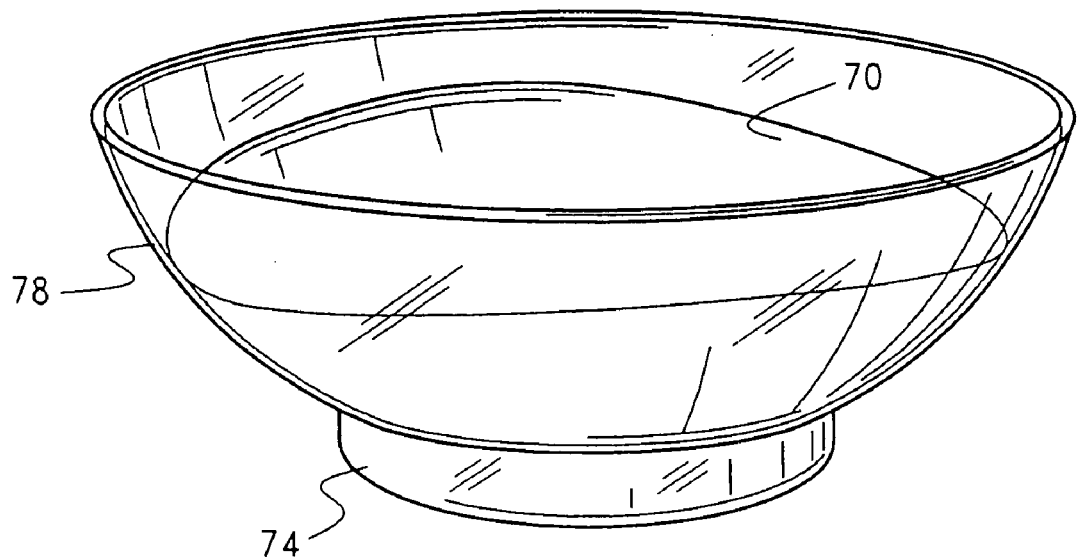
FIG. 11 is a perspective view of a further variation.
Figure 12:
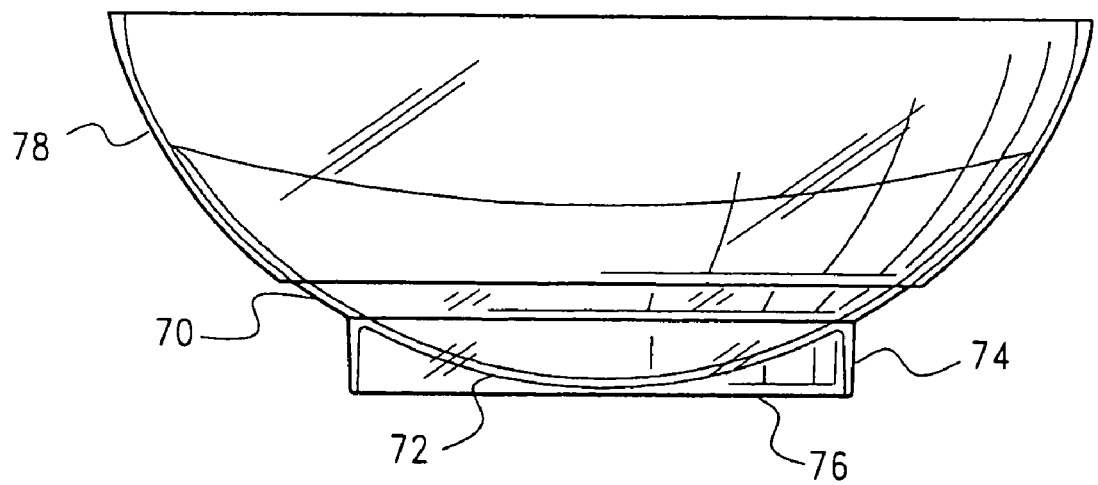
FIG. 12 is an elevational view of the container of FIG. 11.

FIGS. 11 and 12 illustrate yet another embodiment wherein the base 70 is semi-circular in cross section with a rounded bottom 72 to which an annular collar 74 is bonded to provide a planar lower edge 76 for a stable support of the formed container. The upper or outer component, the ring 78 has the lower edge thereof spaced above the support providing collar 74 to expose both the lower portion of the base 70 and the support collar. The ring 78, as with the previously described rings, projects above the upper edge of the base 70 to define the uppermost zone.

While the invention has been illustrated and basically described as utilized in the formation of serving bowls and the like, the structure and features of the invention as proposed herein are equally adapted for use in the formation of substantially any type of container, including pitchers, flower vases, storage containers, etc. In those instances wherein the container is to be provided with a lid, as with regard to storage containers, it would be an obvious expedient to provide the uppermost component or ring with an upper edge adapted to receive an appropriate cover.

The foregoing is considered illustrative of the principles of the invention. As modifications and changes may occur to those skilled in the art, it is not desired to limit the invention to the exact construction and manner of use as shown and described. Rather, all suitable modifications and equivalents may be resorted to as falling within the scope of the invention.

What is claimed is:

1. A method of making an integral container of multiple intimately bonded pre-cursor components, said method comprising the steps of:
   molding, in a first step, a base component having a closed bottom and a peripheral wall extending upward from said bottom; said peripheral wall terminating in an outward extending beveled edge;
   molding, in a second molding step, a separate ring component having a configuration complementary to the configuration of the base component, said ring component comprising a peripheral wall having a lower end and inner and outer surfaces, and an angled transition shoulder disposed around said inner surface; and
   telescopically engaging said ring component with said base component to form the container, such that the beveled edge of the base component aligns with or blends into the angled transition shoulder of the ring component, thus providing for a smooth transition area about an inner surface of the formed container.

2. The method of claim 1 wherein the first and second molding steps are carried out utilizing synthetic resinous material.

3. The method of claim 1 wherein the molding of the first and second components is carried out in a single molding apparatus.

4. The method of claim 1 wherein the molding of the first and second components is carried out in at least two molding apparatuses.

5. The method of claim 1 wherein the first and second molding steps are an injection molding.

6. The method of claim 1 wherein the base and ring components each have a color incorporated therein.

7. The method of claim 1 wherein one of the base component and ring component defines an outer component, and the other of said base component and ring component defines an inner component, the inner component being visible through the outer component.

8. The method of claim 1 wherein the lower edge of the ring component is spaced below a top edge of the peripheral wall of the base component; and wherein the ring component has an upper edge spaced above the top edge of the peripheral wall of the base component.

9. The method of claim 1 wherein said ring component defines an upper extension of the peripheral wall of the base component and three zones, a first zone comprising the base component below the ring component, a second zone comprising the overlapped area of the base component and ring component, and a third zone comprising the ring component above the base component.

10. The method of claim 9 wherein the first and third zones are respectively the colors of the base component and the ring component; and whereby the second zone is of a color defined by the overlapping colors of the base component and the ring component.

11. A method of making an integral container of multiple intimately bonded pre-cursor components, said method comprising the steps of:
   molding, in a first step, a base component having a closed bottom and a peripheral wall having an inner and outer surface extending upward from said bottom, said inner surface having an angled transition shoulder formed thereon;
   molding, in a second molding step, a separate ring component having a configuration complementary to the configuration of the base component, said ring component comprising a peripheral wall having a first end, said first end terminating in an outward extending beveled edge; and telescopically engaging said ring component with said base component to form the container, such that the beveled edge of the ring component aligns with or blends into the angled transition shoulder of the base component, thus providing for a smooth transition area about an inner surface of the formed container.

12. The method of claim 1 wherein an angled transition shoulder is formed on the outer surface of said peripheral wall of said base component, and wherein the lower end of said peripheral wall of said ring component is slightly rounded, such that the lower edge of the ring component aligns with the angled transition shoulder of the base component when the base and ring components are telescopically engaged.

13. The method of claim 1, further comprising a second ring component disposed between said base component and said ring component, said second ring component having a configuration complementary to the configuration of the base and ring components, said second ring component comprising a peripheral wall terminating in an outward extending beveled edge, said peripheral wall having an inner surface with an angled transition shoulder formed thereon.

* * * * *